J. R. SMITH.
FERTILIZER DISTRIBUTER.
APPLICATION FILED MAY 9, 1914.
1,108,263.
Patented Aug. 25, 1914.
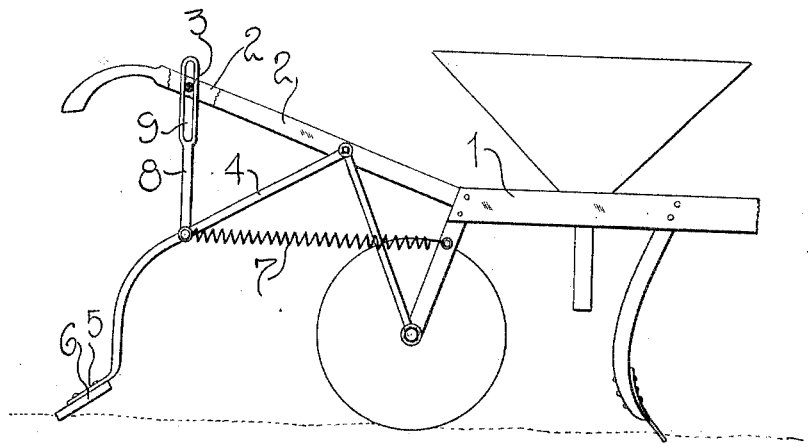
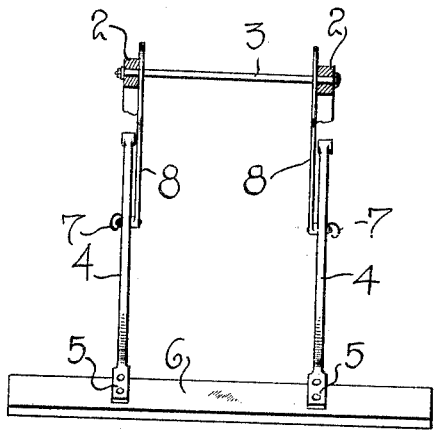
Witnesses
Robert M. Sutphen
A. I. Hind
Inventor
J. R. Smith
By Watson E. Coleman
Attorney

UNITED STATES PATENT OFFICE.

JOHN RANSOM SMITH, OF HAYNESVILLE, LOUISIANA.

FERTILIZER-DISTRIBUTER.

1,108,263.  Specification of Letters Patent.  Patented Aug. 25, 1914.

Application filed May 9, 1914. Serial No. 837,514.

*To all whom it may concern:*

Be it known that I, JOHN RANSOM SMITH, a citizen of the United States, residing at Haynesville, in the parish of Claiborne and State of Louisiana, have invented certain new and useful Improvements in Fertilizer-Distributers, of which the following is a specification, reference being had to the accompanying drawings.

This invention relates to certain improvements in fertilizer distributers and has relation to an attachment therefor, and the object of the invention is to provide an attachment of this general character having novel and improved means whereby the same may be applied with facility and convenience to the distributer and serve, in an effective manner, to cover the fertilizer after the same has been discharged from the distributer.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a side elevational view of a distributer, having an attachment constructed in accordance with an embodiment of my invention applied thereto; and Fig. 2 is a rear elevational view of the device as shown in Fig. 1, with the handle shown in section.

As disclosed in the accompanying drawings, 1 denotes a distributer of an ordinary or preferred type and including the rearwardly directed handle bars 2—2 connected at a point intermediate their lengths by the cross bar 3. Pivotally engaged with the bars 2 at a predetermined point are the arms 4—4 disposed longitudinally on a requisite curvature and having their lower extremities 5 adapted to be suitably secured to a covering implement 6 which may be in the form of a solid board or of a rake formation as the necessities of practice may require. For convenience of illustration I disclose in the accompanying drawings the covering implement or member 6 as a board. The board 6 is adapted to engage the surface over which the distributer is drawn and serves as a coverer as is believed to be clearly apparent to those skilled in the art to which my present invention appertains. In order that the proper engagement of the covering member 6 with the surface may be maintained I interpose between the arms 4 and the adjacent face of the distributer 1 springs 7. It will also be observed that the springs 7 will permit the covering member 6 to rise upwardly should any undue obstruction be encountered or from any other cause which would otherwise result in injury to the board. Pivotally connected with the arms 4 intermediate their length are the upstanding rods 8, the upper extremities whereof being provided with longitudinally disposed elongated slots 9 through which the cross bar 3 of the handle bars 2 are directed, whereby it will be readily perceived that the covering member 6 is effectively maintained in operative position.

From the foregoing, it is thought to be obvious that a fertilizer distributer constructed in accordance with an embodiment of my invention is of an extremely simple and comparatively inexpensive nature and is particularly well adapted for use by reason of the convenience with which the object of the invention is attained, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a distributer provided with handle bars, rods pivotally engaged with the handle bars, a covering member secured to the lower extremities of such rods, spring members interposed between the rods and the distributer for maintaining the covering member normally in contact with the surface over which the distributer travels.

2. In combination with a distributer provided with handle bars, rods pivotally engaged with the handle bars, a covering member secured to the lower extremities of such rods, spring members interposed between the rods and the distributer for maintaining the covering member normally in contact with the surface over which the distributer travels, supplemental arms engaged with the first-mentioned arms and operatively engaged with the handle bars.

3. In combination with a distributer including handle bars, and a cross bar connecting such handle bars, arms pivotally engaged with the handle bars, a covering member operatively connected with the handle bars, a spring interposed between the bars and the distributer for maintaining the covering member normally in contact with the surface over which the distributer travels, and supplemental bars engaged with the first mentioned bars, such supplemental bars being provided in their upper extremities with elongated slots through which the cross bar of the handle bars are connected.

In testimony whereof I hereunto affix my signature in the presence of two witnesses.

JOHN RANSOM SMITH.

Witnesses:
G. L. LINDY,
J. H. FERGUSON.

---

Copies of this patent may be obtained for five cents each, by addressing the "Commissioner of Patents, Washington, D. C."